United States Patent
Wu et al.

(10) Patent No.: US 8,511,705 B2
(45) Date of Patent: Aug. 20, 2013

(54) WHEEL AUTOMATIC ADJUSTMENT MECHANISM AND FOLDABLE MOTORIZED VEHICLE HAVING SAME

(75) Inventors: Chichun Wu, Dongguan (CN); Zhao Zhang, Dongguan (CN)

(73) Assignee: Chichun Wu, Dongguan, Guangdong Province (CN)

( * ) Notice: Subject to any disclaimer, the term of this patent is extended or adjusted under 35 U.S.C. 154(b) by 99 days.

(21) Appl. No.: 13/357,247

(22) Filed: Jan. 24, 2012

(65) Prior Publication Data

US 2012/0193886 A1    Aug. 2, 2012

(30) Foreign Application Priority Data

Jan. 28, 2011 (CN) .......................... 2011 2 0029836
Jan. 28, 2011 (CN) .......................... 2011 2 0029857

(51) Int. Cl.
*B62B 7/06* (2006.01)

(52) U.S. Cl.
USPC ........... 280/639; 280/648; 280/657; 280/263; 280/267; 280/415.1; 280/491.1; 280/47.34; 280/47.38

(58) Field of Classification Search
USPC ......... 280/87.01–87.041, 638–639, 647–648, 280/651, 655.1, 657, 263, 267–269, 415.1, 280/491.1, 47.34–47.35, 47.371, 47.38
See application file for complete search history.

(56) References Cited

U.S. PATENT DOCUMENTS

| | | | | |
|---|---|---|---|---|
| 4,176,850 A * | 12/1979 | Johnson | ................. | 280/87.042 |
| 6,120,044 A * | 9/2000 | Tsai | ................. | 280/87.05 |
| 6,557,873 B2 * | 5/2003 | Nardone | ................. | 280/87.042 |
| 6,793,224 B2 * | 9/2004 | Stratton | ................. | 280/87.042 |
| 6,827,358 B2 * | 12/2004 | Beleski, Jr. | ................. | 280/87.041 |
| 6,880,840 B2 * | 4/2005 | Chuang | ................. | 280/87.041 |
| 6,913,272 B2 * | 7/2005 | Chang | ................. | 280/87.042 |
| 7,219,907 B2 * | 5/2007 | Chang | ................. | 280/87.042 |
| 7,364,174 B2 * | 4/2008 | Morris | ................. | 280/87.042 |
| 7,438,303 B2 * | 10/2008 | Cole | ................. | 280/87.042 |
| 7,862,055 B2 * | 1/2011 | Bennett | ................. | 280/87.041 |
| 8,162,090 B2 * | 4/2012 | Atherton et al. | ................. | 180/208 |
| 8,172,243 B2 * | 5/2012 | Dresher | ................. | 280/47.38 |
| 8,328,206 B2 * | 12/2012 | Williams, Jr. | ................. | 280/11.28 |
| 8,328,209 B2 * | 12/2012 | Tsai | ................. | 280/87.043 |
| 8,388,014 B2 * | 3/2013 | Wu et al. | ................. | 280/638 |
| 2002/0053775 A1 * | 5/2002 | Feng | ................. | 280/87.041 |
| 2002/0063405 A1 * | 5/2002 | Nardone | ................. | 280/87.041 |
| 2002/0063406 A1 * | 5/2002 | Feng | ................. | 280/87.041 |
| 2002/0063411 A1 * | 5/2002 | Feng | ................. | 280/278 |

(Continued)

*Primary Examiner* — Jeffrey J Restifo
*Assistant Examiner* — Erez Gurari
(74) *Attorney, Agent, or Firm* — Morris Manning & Martin LLP; Tim Tingkang Xia, Esq.

(57) ABSTRACT

An automatic wheel adjustment mechanism mounted between two front wheels and a front wheel stem of a foldable motorized vehicle, comprising: (a) a front wheel supporting shaft having a bearing housing positioned on the top center portion of the front wheel supporting shaft, a first connecting portion, and a second connecting portion positioned on the front wheel supporting shaft, (b) a connecting member having a ring on one end and a connecting shaft on other end, wherein the connecting shaft extends upwards to form a connecting portion, and (c) a plurality of bearings, wherein outer races of the bearings is fixed at the center portion of the front wheel supporting shaft, the ring of the connecting member is connected to the lower end of the front wheel stem, the connecting shaft of the connecting member passes through and fixedly connected to the inner races of the plurality of the bearings.

8 Claims, 6 Drawing Sheets

(56) References Cited

U.S. PATENT DOCUMENTS

| | | | |
|---|---|---|---|
| 2002/0096855 A1* | 7/2002 | Lee | 280/244 |
| 2002/0125670 A1* | 9/2002 | Stratton | 280/87.041 |
| 2002/0149166 A1* | 10/2002 | Potter | 280/87.042 |
| 2004/0135334 A1* | 7/2004 | Cheng | 280/87.03 |
| 2005/0077097 A1* | 4/2005 | Kosco et al. | 180/208 |
| 2005/0082778 A1* | 4/2005 | Chuang | 280/87.041 |
| 2006/0145443 A1* | 7/2006 | Morris | 280/87.01 |
| 2007/0235971 A1* | 10/2007 | Woods et al. | 280/87.041 |
| 2010/0126789 A1* | 5/2010 | Scragg | 180/208 |
| 2010/0327547 A1* | 12/2010 | Wilson et al. | 280/87.042 |
| 2011/0109058 A1* | 5/2011 | Janis et al. | 280/263 |
| 2013/0113172 A1* | 5/2013 | Lovley et al. | 280/87.041 |

\* cited by examiner

WHEEL AUTOMATIC ADJUSTMENT MECHANISM AND FOLDABLE MOTORIZED VEHICLE HAVING SAME

CROSS-REFERENCE TO RELATED APPLICATIONS

This application claims priority to and benefit of, pursuant to 35 U.S.C. §119(a), Chinese Patent Application No. 201120029857.8, filed Jan. 28, 2011, and Chinese Patent Application No. 2011 2002 9836.6, filed Jan. 28, 2011, the disclosures of which are incorporated herein by reference in their entireties.

FIELD OF THE PRESENT INVENTION

The present invention relates to an adjustment mechanism, in particular, to an automatic wheel adjustment mechanism mounted between front wheels and a front wheel stem of an foldable motorized vehicle, for ensuring that both front wheels contact the ground while turning.

BACKGROUND OF THE PRESENT INVENTION

Currently, for better use experience of drivers of different ages and different physical conditions, four-wheel motorized vehicle are mostly disposed with an angle adjustment mechanism between a front wheel stem and a body rack. The angle adjustment mechanism can be used by a driver to adjust the angle freely, so that every driver can hold the handle mounted on the front wheel stem when sitting on a seat to control the handle, meeting requirements of different users, and being convenient in use.

However, in the current four-wheel motorized vehicle, the two front wheels are generally fixedly connected to the front wheel stem directly, and when the front wheel stem is in a vertical state, the driver can normally control the driving direction of the two front wheels when rotating the front wheel stem to the left or the right. However, when the driver adjusts the front wheel stem to an angle through the angle adjustment mechanism, the front wheel stem assumes an inclined state with respect to that before the adjustment, so when the electric vehicle turns and the front wheel stem is rotated through the handle, the front wheel stem drives an axle of the two front wheels to swing, thus causing one of the two front wheels tilts with respect to the other one. The tilted front wheel cannot travel without leaving the ground, which has a great impact on the driving safety during turning, and the technology used in the current motorized vehicle is unable to solve the above problem.

Therefore, a heretofore unaddressed need exists in the art to address the aforementioned deficiencies and inadequacies.

SUMMARY OF THE PRESENT INVENTION

The present invention provides an automatic wheel adjustment mechanism having a simple structure and capable of preventing the front wheels of a motorized vehicle from tilting to affect driving safety.

In one aspect, the present invention is related to an automatic wheel adjustment mechanism mounted between a first front wheel and a second front wheel and a front wheel stem of a foldable motorized vehicle. In one embodiment, the automatic wheel adjustment mechanism includes: (a) a front wheel supporting shaft, (b) a connecting member, and (c) a plurality of bearings. In one embodiment, the front wheel supporting shaft has a first end, a second end, a bearing housing positioned on the top center portion of the front wheel supporting shaft, a first connecting portion positioned on a first end of the front wheel supporting shaft, and a second connecting portion positioned on a second end of the front wheel supporting shaft. The connecting member has a ring shaped body on a first end and a connecting shaft on a second end. The connecting shaft extends upwards to form a connecting portion.

In one embodiment, the outer races of the plurality of the bearings are fixed at the center portion of the front wheel supporting shaft inside of the bearing housing. The ring shaped body of the connecting member is connected to the lower end of the front wheel stem, the connecting shaft of the connecting member passes through and fixedly connected to the inner races of the plurality of the bearings. The plurality of the bearings is mounted inside of the bearing housing of the front wheel supporting shaft.

The first front wheel is mounted on the first end of the front wheel supporting shaft, and the second front wheel is mounted on the second end of the front wheel supporting shaft. The lower end of the front wheel stem is inserted into the ring shaped body of the connecting member and is fixed onto the ring shaped body of the connecting member.

In one embodiment, the connecting shaft of the connecting member is perpendicular to the ring shaped body of the connecting member and protrudes forward from the connecting member, and mounted inside of the inner races of the plurality of the bearings.

The automatic wheel adjustment mechanism further includes a first shock absorber and a second shock absorber. Each of the first and the second shock absorbers comprises a first end portion, a second end portion, and an elastic element. The elastic element is disposed obliquely between the first end portion and the second end portion of the first and second shock absorbers.

In one embodiment, the first end portion of the first shock absorber is connected to the connecting portion of the connecting member. The second end portion of the first shock absorber is connected to the first connecting portion of the front wheel supporting shaft. The first end portion of the second shock absorber is connected to the connecting portion of the connecting member. The second end portion is connected to the second connecting portion of the front wheel supporting shaft.

The elastic element of the first shock absorber and the second shock absorber comprises coil spring, and the elastic element of the first shock absorber and the second shock absorber are placed on two sides of the connecting shaft of the connecting member, symmetrically, in a shape of two splayed legs.

In another aspect, the present invention relates to a foldable motorized vehicle. In one embodiment, the foldable motorized vehicle has a first front wheel, a second front wheel, a front wheel stem, and an automatic wheel adjustment mechanism mounted between the first front wheel and the second front wheel and the front wheel stem. The automatic wheel adjustment mechanism in one embodiment includes a front wheel supporting shaft having a first end, a second end, a bearing housing positioned on the top center portion of the front wheel supporting shaft, a first connecting portion positioned on a first end of the front wheel supporting shaft, and a second connecting portion positioned on a second end of the front wheel supporting shaft, a connecting member having a ring shaped body on a first end and a connecting shaft on a second end, wherein the connecting shaft extends upwards to form a connecting portion, and a plurality of bearings mounted inside of the bearing housing.

Outer races of the plurality of the bearings is fixed at the center portion of the front wheel supporting shaft inside of the bearing housing, the ring shaped body of the connecting member is connected to the lower end of the front wheel stem, the connecting shaft of the connecting member passes through and fixedly connected to the inner races of the plurality of the bearings.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE PRESENT INVENTION

Figure 1:
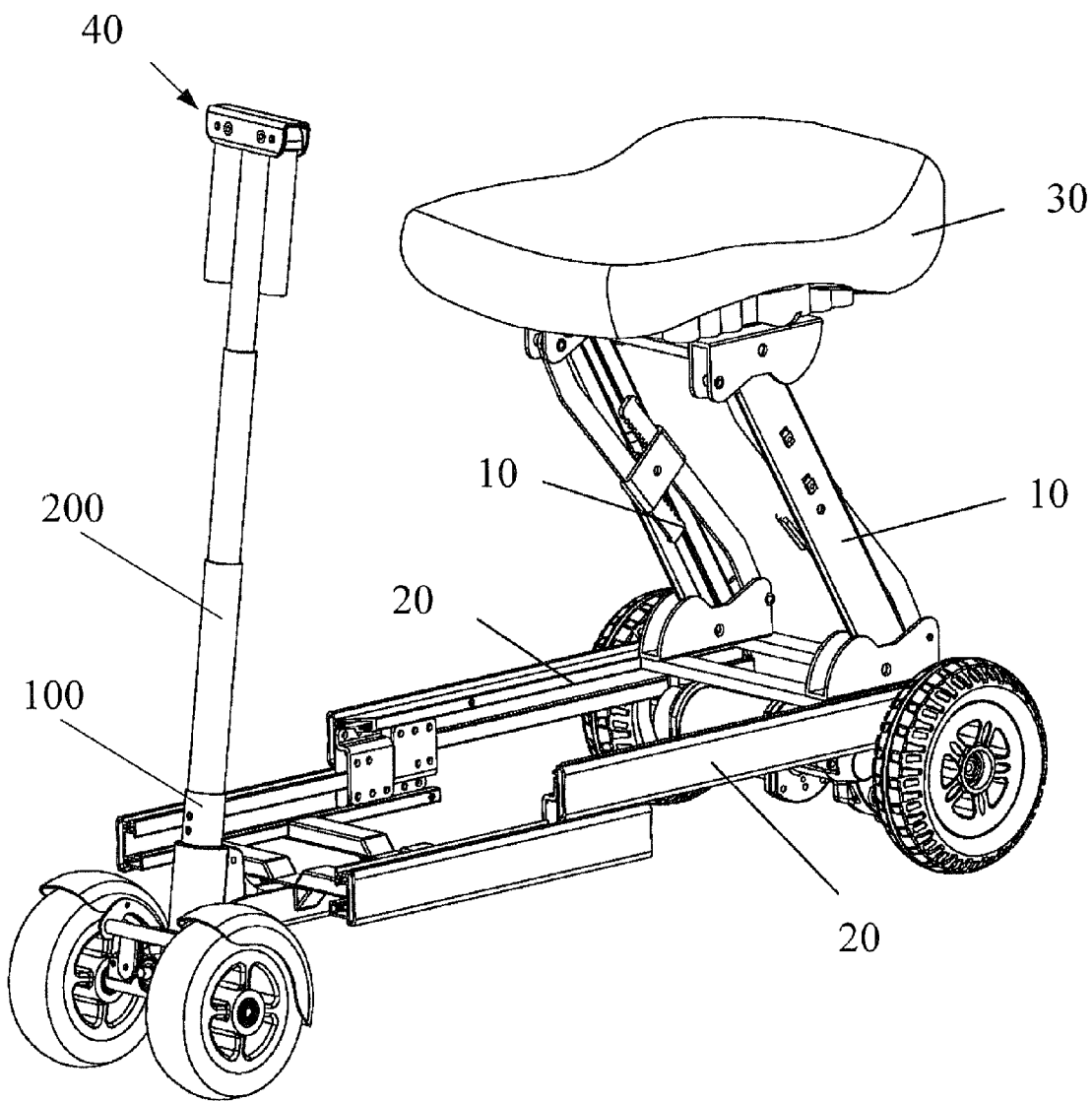
FIG. 1 is an abbreviated perspective view of a foldable motorized vehicle according one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Embodiments of the present invention are described below with reference to the accompanying drawings, and in the accompanying drawings like reference numerals represent like elements.

Referring now to FIG. 1, a perspective view of a foldable motorized vehicle is shown according one embodiment of the present invention. The foldable motorized vehicle has: (a) a foldable frame body 20, (b) a foldable seat mounting rack 10, (c) a seat 30, (d) a front wheel steering mechanism 100, and (e) handlebar folding mechanism 40 with two foldable handlebars, and a steering axial rod 200. As it is shown in FIG. 1, the seat, the frame body, and steering are all foldable so that the entire vehicle is foldable to save storage space.

Figure 2:
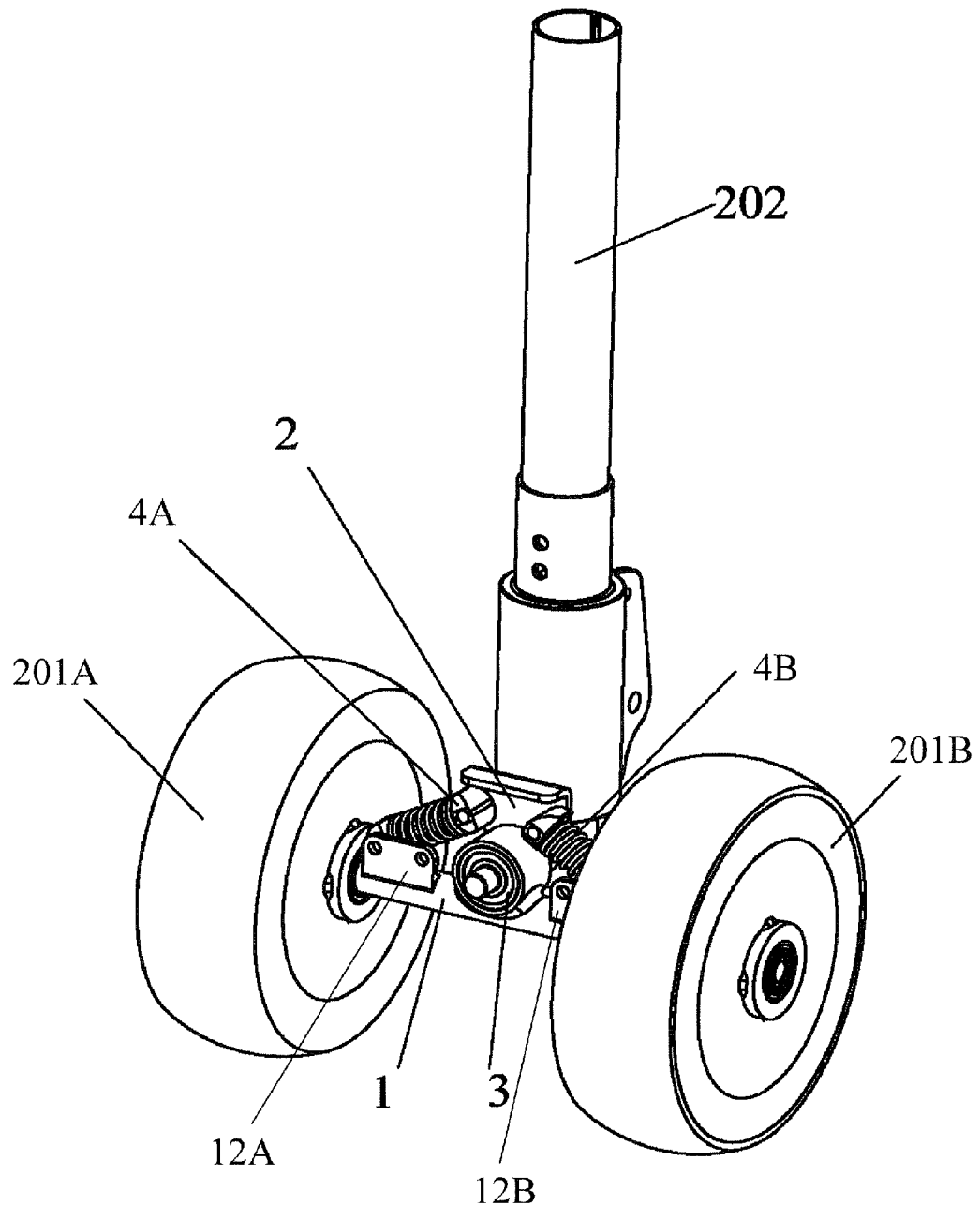
FIG. 2 is an perspective view of an automatic wheel adjustment mechanism according to one embodiment of the present invention.
Figure 3:
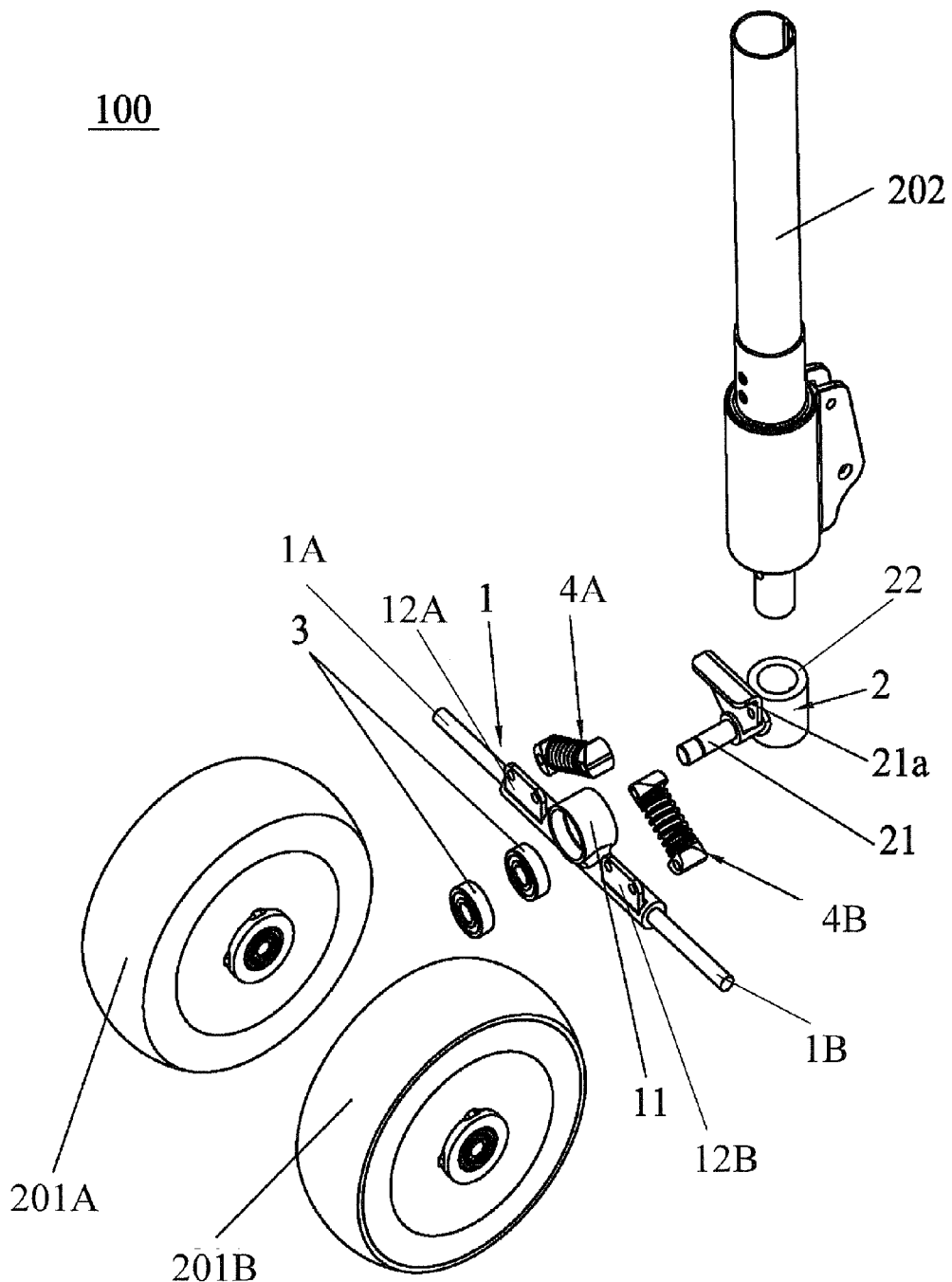
FIG. 3 is an exploded perspective view of the automatic wheel adjustment mechanism according to one embodiment of the present invention.

FIG. 2 offers a closer and detailed view of the automatic wheel adjustment mechanism 100 of the foldable motorized vehicle according to one embodiment of the present invention. Referring now to FIG. 3, an exploded perspective view of the automatic wheel adjustment mechanism is shown according to one embodiment of the present invention. In one embodiment, the automatic wheel adjustment mechanism includes: (a) a front wheel supporting shaft 1, (b) a connecting member 2, and (c) a plurality of bearings 3. The front wheel supporting shaft 1 has a first end 1A, a second end 1B, a bearing housing 11 positioned on the top center portion of the front wheel supporting shaft 1, a first connecting portion 12A positioned on a first end 1A of the front wheel supporting shaft 1, and a second connecting portion 12B positioned on a second end 1B of the front wheel supporting shaft 1.

Figure 4:
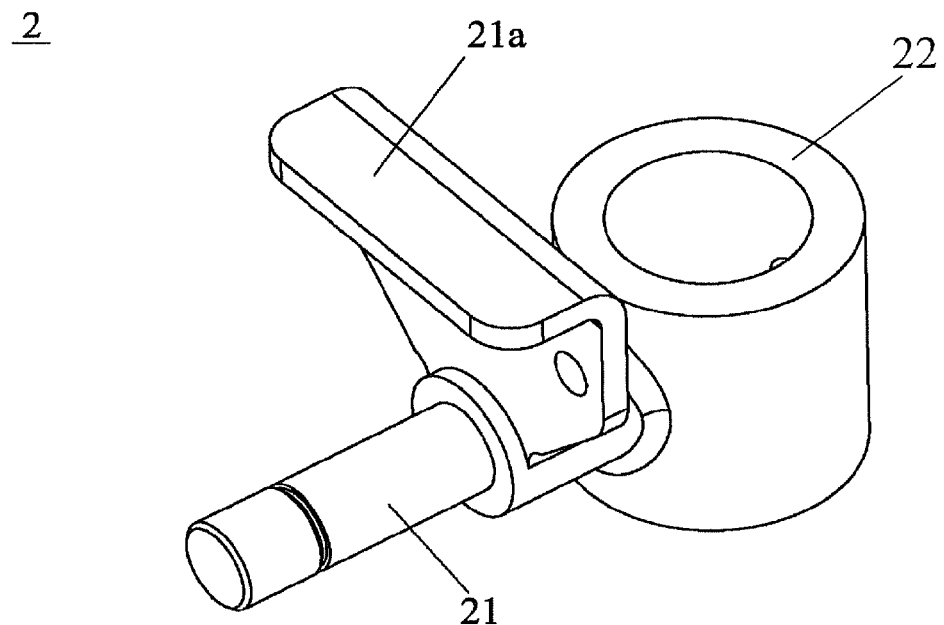
FIG. 4 is a perspective view of a connecting member in the automatic wheel adjustment mechanism according to one embodiment of the present invention.

As shown in FIG. 4, in one embodiment, the connecting member 2 has a ring shaped body 22 on a first end and a connecting shaft 21 on a second end. The connecting shaft 21 extends upwards to form a connecting portion 21a. The plurality of the bearings 3 are mounted inside of the bearing housing 11 of the front wheel supporting shaft 1.

The first front wheel 201A is mounted on the first end 1A of the front wheel supporting shaft 1, and the second front wheel 201B is mounted on the second end 1B of the front wheel supporting shaft 1.

The lower end of the front wheel stem 202 is inserted into the ring shaped body 22 of the connecting member 2 and is fixed onto the ring shaped body 22 of the connecting member 2.

The connecting shaft 21 of the connecting member 2 is perpendicular to the ring shaped body 22 of the connecting member 2 and protrudes forward from the connecting member 2, and mounted inside of the inner races of the plurality of the bearings 3.

Figure 5:
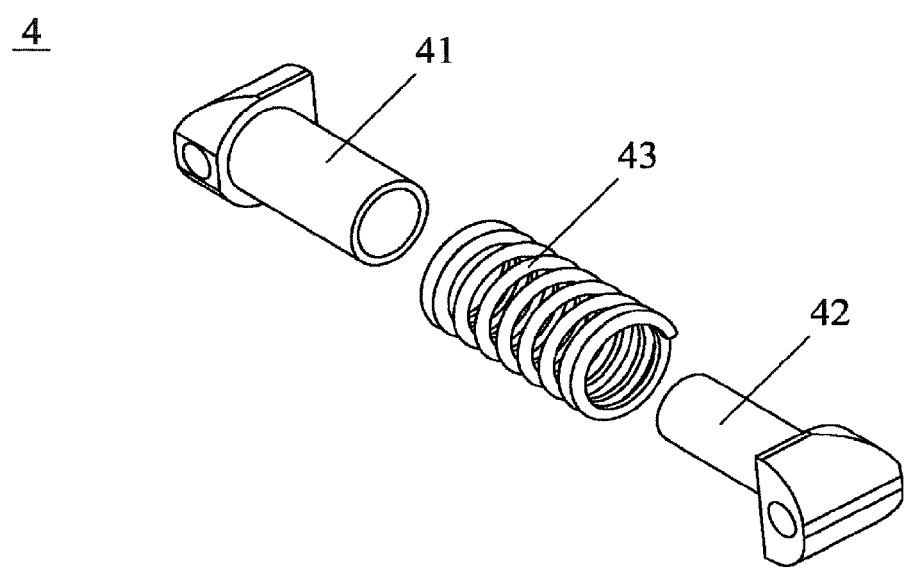
FIG. 5 is a perspective view of a shock absorber in the automatic wheel adjustment mechanism according to one embodiment of the present invention.

Referring to FIG. 5, the automatic wheel adjustment mechanism 100 further includes a first shock absorber 4A and a second shock absorber 4B. Each of the first and second shock absorbers comprises a first end portion 41, a second end portion 42, and an elastic element 43. The elastic element 43 is disposed obliquely between the first end portion 41, and the second end portion 42 of the first and second shock absorbers.

The first end portion 41 of the first shock absorber 4A is connected to the connecting portion 21a of the connecting member 2. The second end portion 42 of the first shock absorber 4A is connected to the first connecting portion 12A of the front wheel supporting shaft 1. The first end portion 41 of the second shock absorber 4B is connected to the connecting portion 21a of the connecting member 2. The second end portion 42 is connected to the second connecting portion 12B of the front wheel supporting shaft 1.

The elastic element 43 of the first shock absorber 4A and the second shock absorber 4B are coil springs. The elastic element 43 of the first shock absorber 4A and the second shock absorber 4B are placed on two sides of the connecting shaft 21 of the connecting member 2, symmetrically, in a shape of two splayed legs.

Figure 6:
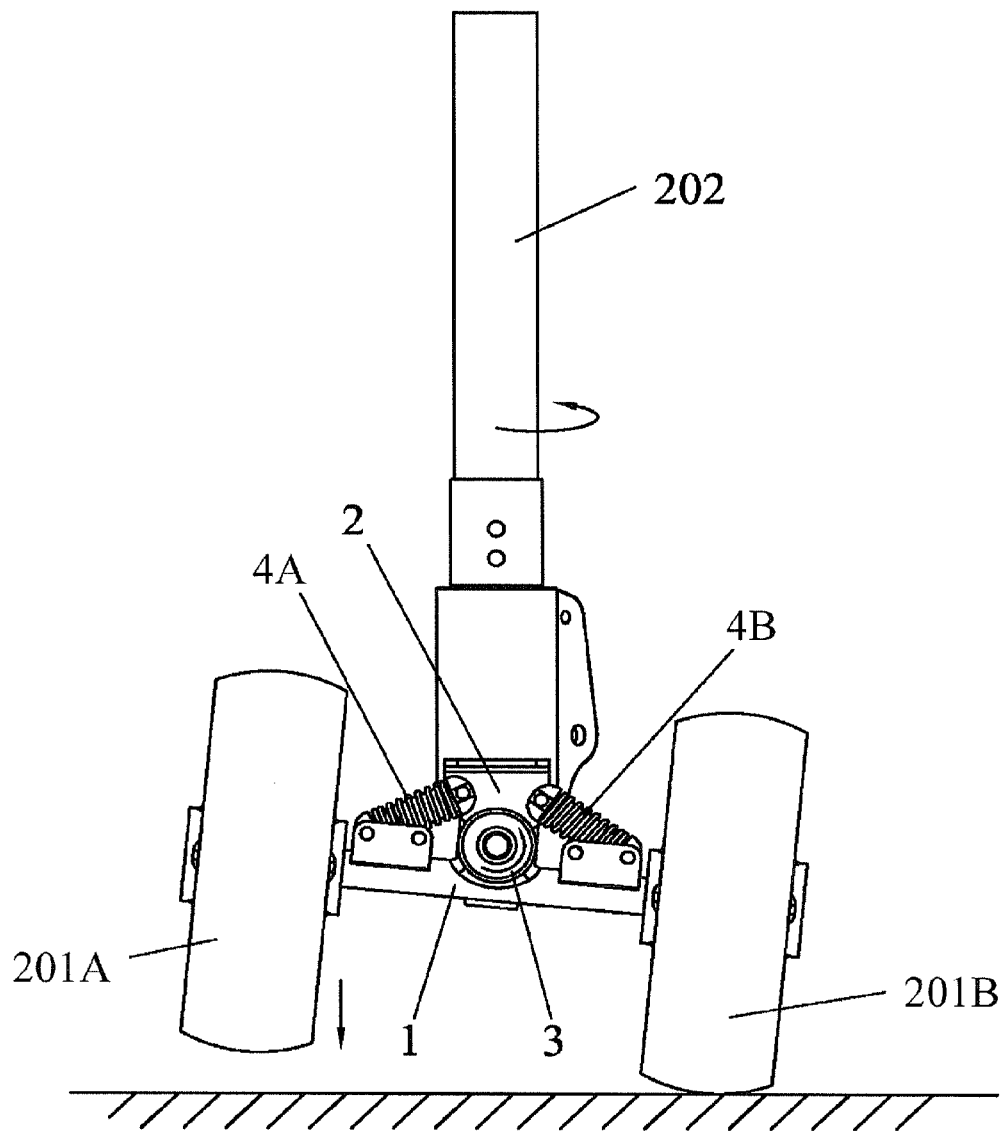
FIG. 6 is a front illustration of the automatic wheel adjustment mechanism when the front wheels were turned according to one embodiment of the present invention.
Figure 7:
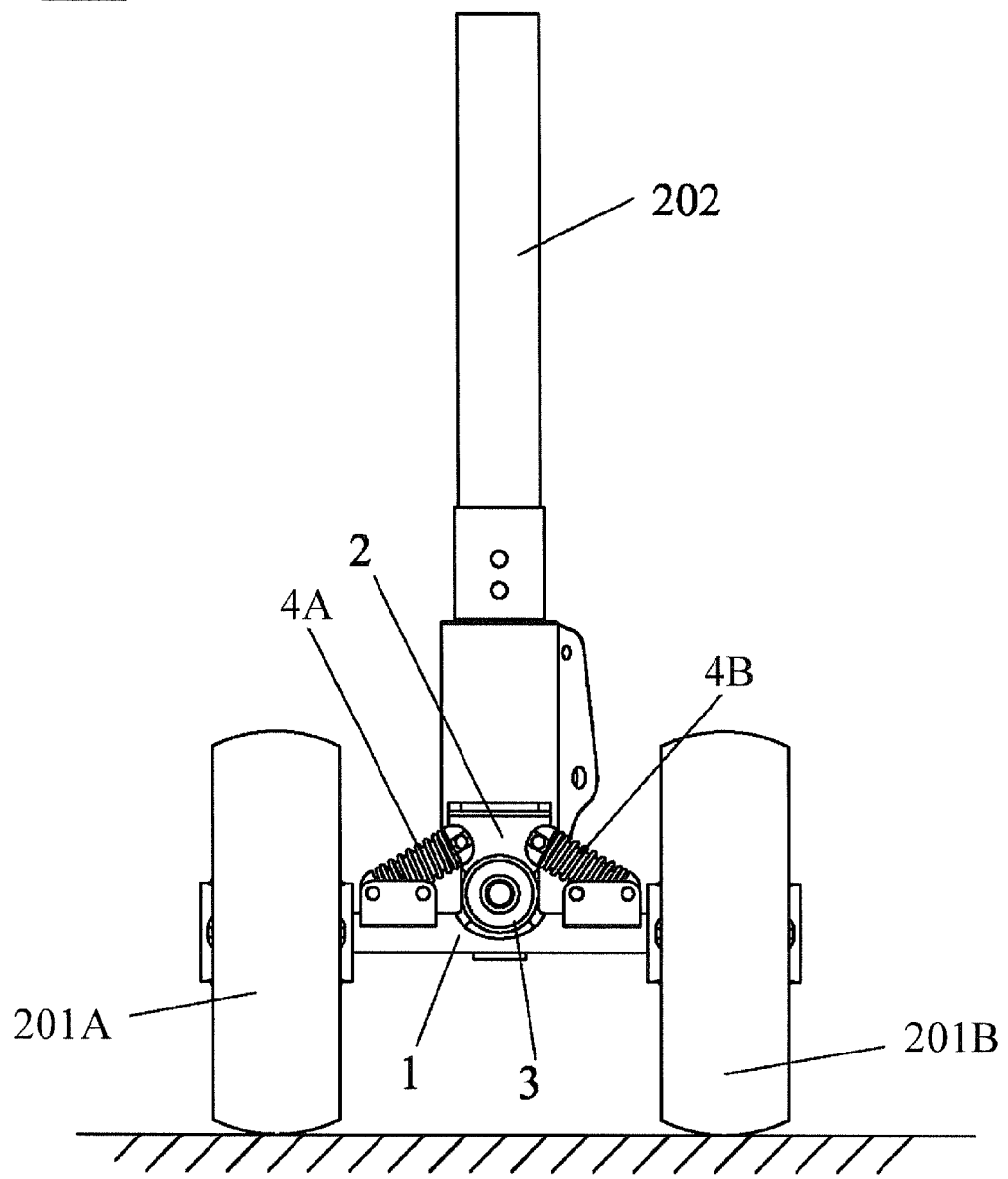
FIG. 7 is a front view of the automatic wheel adjustment mechanism after the wheels automatically adjustment according to one embodiment of the present invention.

In view of the above and referring to FIG. 6 and FIG. 7, the front wheel stem 202 is perpendicular to the front wheel supporting shaft 1, during turning, the front wheel stem 202 is rotated, so as to drive the connecting member 2 to rotate. The connecting member 2 drives the connecting shaft 21 to swing towards the turning direction, then the connecting shaft 21 drives the front wheel supporting shaft 1 to swing. At this time, the front wheel supporting shaft 1 rotates in parallel to the ground, the first front wheel 201A and the second front wheel 210B roll and turn without leaving the ground. After the front wheel stem 202 is adjusted to be inclined, during turning, the front wheel stem 202 is rotated, so as to drive the connecting member 2 to rotate, the connecting member 2 is inclined along with the front wheel stem 202, and therefore, after the connecting member 2 rotates to drive the connecting shaft 21 to swing, one end of the front wheel supporting shaft 1 tilts with respect to the other end. Then, the front wheel supporting shaft 1 is no longer parallel to the ground but has one end tilted, and one of the front wheels 201 is driven by the front wheel supporting shaft 1 to tilt. The connecting shaft 21 is pivoted on the front wheel supporting shaft 1 through the bearings 3, and therefore, the tilted end of the front wheel supporting shaft 1 descends along an axis of the connecting shaft 21 under the action of gravity of the front wheel 201. The tilted front wheel 201 also descends along with the front wheel supporting shaft 1, such that the front wheel supporting shaft 1 keeps in parallel to the ground, thus enabling the front wheels 201 to roll and turn without leaving the ground.

Compared with the prior art, in the present invention, the bearings 3 are mounted at the middle portion of the front wheel supporting shaft 1, the connecting member 2 is sleeved on and fixed to the front wheel stem 202, and the connecting shaft 21 is sleeved on and fixed to the bearings 3, so that when the front wheel stem 202 rotates to swing the connecting shaft 21, the front wheel supporting shaft 1 is further driven to swing, thereby realizing turning. After the front wheel supporting shaft 1 swings, the front wheel supporting shaft 1 rotates along the connecting shaft 21 under the action of gravity of the front wheel 201, so as to enable the first front wheel 201A and the second front wheel 201B to travel without leaving the ground, thereby preventing the first front wheel 201A and the second front wheel 201B from tilting to affect driving safety. The present invention has a simple structure and is convenient in use. In addition, the first shock absorber 4A and the second shock absorber 4B are disposed to enable the automatic wheel adjustment mechanism 100 to reduce the shock incurred by the front wheels 201 to the front wheel stem 202 when adjusting the front wheels 201 during turning, thereby making the driving more comfortable.

The angle adjustment method of the front wheel stem 202 involved in the automatic wheel adjustment mechanism 100 according to the present invention is well known by those of ordinary skill in the art, and is not illustrated in detail.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An automatic wheel adjustment mechanism mounted between a first front wheel and a second front wheel and a front wheel stem of a foldable motorized vehicle, comprising:
    (a) a front wheel supporting shaft having a first end, a second end, a bearing housing positioned on the top center portion of the front wheel supporting shaft, a first connecting portion positioned on a first end of the front wheel supporting shaft, and a second connecting portion positioned on a second end of the front wheel supporting shaft;
    (b) a connecting member having a ring shaped body on a first end and a connecting shaft on a second end, wherein the connecting shaft extends upwards to form a connecting portion; and
    (c) a plurality of bearings mounted inside of the bearing housing,
        wherein outer races of the plurality of the bearings is fixed at the center portion of the front wheel supporting shaft inside of the bearing housing, the ring shaped body of the connecting member is connected to the lower end of the front wheel stem, the connecting shaft of the connecting member passes through and fixedly connected to the inner races of the plurality of the bearings.

2. The automatic wheel adjustment mechanism according to claim 1, wherein the first front wheel is mounted on the first end of the front wheel supporting shaft, and the second front wheel is mounted on the second end of the front wheel supporting shaft.

3. The automatic wheel adjustment mechanism according to claim 2, wherein the lower end of the front wheel stem is inserted into the ring shaped body of the connecting member and is fixed onto the ring shaped body of the connecting member.

4. The automatic wheel adjustment mechanism according to claim 3, wherein the connecting shaft of the connecting member is perpendicular to the ring shaped body of the connecting member and protrudes forward from the connecting member, and mounted inside of the inner races of the plurality of the bearings.

5. The automatic wheel adjustment mechanism according to claim 4, wherein the automatic wheel adjustment mechanism further comprises a first shock absorber and a second shock absorber, each of the first and second shock absorbers comprises a first end portion, a second end portion, and an elastic element, the elastic element is disposed obliquely between the first end portion and the second end portion of the first and second shock absorbers.

6. The automatic wheel adjustment mechanism according to claim 5, wherein the first end portion of the first shock absorber is connected to the connecting portion of the connecting member, the second end portion of the first shock absorber is connected to the first connecting portion of the front wheel supporting shaft, the first end portion of the second shock absorber is connected to the connecting portion of the connecting member, and the second end portion is connected to the second connecting portion of the front wheel supporting shaft.

7. The automatic wheel adjustment mechanism according to claim 6, wherein the elastic element of the first shock absorber and the second shock absorber comprises coil spring, and the elastic element of the first shock absorber and the second shock absorber are placed on two sides of the connecting shaft of the connecting member, symmetrically, in a shape of two splayed legs.

8. A foldable motorized vehicle, comprising:
a first front wheel;
a second front wheel;
a front wheel stem; and
an automatic wheel adjustment mechanism mounted between the first front wheel and the second front wheel and the front wheel stem, the automatic wheel adjustment mechanism comprising:
(a) a front wheel supporting shaft having a first end, a second end, a bearing housing positioned on the top center portion of the front wheel supporting shaft, a first connecting portion positioned on a first end of the front wheel supporting shaft, and a second connecting portion positioned on a second end of the front wheel supporting shaft;
(b) a connecting member having a ring shaped body on a first end and a connecting shaft on a second end, wherein the connecting shaft extends upwards to form a connecting portion; and
(c) a plurality of bearings mounted inside of the bearing housing,
wherein outer races of the plurality of the bearings is fixed at the center portion of the front wheel supporting shaft inside of the bearing housing, the ring shaped body of the connecting member is connected to the lower end of the front wheel stem, the connecting shaft of the connecting member passes through and fixedly connected to the inner races of the plurality of the bearings.

* * * * *